United States Patent
Schuemann

[15] 3,635,095
[45] Jan. 18, 1972

[54] GRAVITY-COMPENSATING MEANS FOR FLUID JET DEFLECTION-TYPE INSTRUMENT

[72] Inventor: Wilfred C. Schuemann, Rawlings Heights, Rawlings, Md.

[73] Assignee: Hercules Incorporated, Wilmington, Del.

[22] Filed: June 5, 1969

[21] Appl. No.: 830,829

[52] U.S. Cl. ................................................... 73/505
[51] Int. Cl. ....................................................... G01p 15/00
[58] Field of Search ............... 73/505, 515, 516; 33/206.5 T; 137/81.5

[56] References Cited

UNITED STATES PATENTS 3,201,999  8/1965  Byrd ........................................ 73/515
3,310,985  3/1967  Beisterling et al. ..................... 73/515

Primary Examiner—James J. Gill
Assistant Examiner—Herbert Goldstein
Attorney—Michael B. Keehan

[57] ABSTRACT

An instrument wherein the deflection of a fluid jet, induced for example by the angular movement of the instrument, produces a signal proportional to the deflection, and particularly means in such an instrument for compensating for unequal deflection of the jet in the different angular positions of the jet about its longitudinal axis, which deflection is induced by local conditions at the sensing means such as convection currents caused by the heating of the jet fluid by the sensing means; the compensating means comprising a flow constrictor located concentrically of the jet downstream from the sensing means and acting to align the fluid flow axially relative to the unit as it passes over the sensing means whereby the thermal deflection of the jet caused by heating as it passes over the sensing elements is substantially eliminated.

5 Claims, 6 Drawing Figures

PATENTED JAN 18 1972

3,635,095

WILFRED C. SCHUEMANN
INVENTOR

BY William F. Smith

AGENT

GRAVITY-COMPENSATING MEANS FOR FLUID JET DEFLECTION-TYPE INSTRUMENT

This invention relates to a fluid jet deflection type instrument, that is, an instrument wherein a fluid jet is adapted to be deflected from a centered condition relative to a sensing means, such as a pair of heated sensing elements whose resistance varies with temperature, the magnitude and the direction of the deflection being measured to produce an output signal to indicate the magnitude and direction of the force or influence inducing the deflection.

An example of the fluid jet deflection type instrument is the angular movement sensing device forming the subject matter of copending U.S. Pat. application Ser. No. 632,239, filed Apr. 20, 1967 now U.S. Pat. No. 3,500,691 dated March 17, 1970. In this device, the deflection of a laminar flow fluid jet from a centered condition relative to a sensing means is produced by the lateral movement of the sensing means during the interval of time that an increment of fluid is in transit in the jet from the nozzle to the sensing means, and the amount and direction of the deflection is an indication of the rate and the direction of the angular movement. A further example of a fluid jet deflection-type instrument is the gravity or acceleration sensitive instrument included in the subject matter of copending U.S. Pat. application Ser. No. 830,826, filed June 5, 1969.

In a fluid jet deflection-type instrument such as that disclosed in the above noted application Ser. No. 632,239, the sensing means comprises for example a pair of spaced sensing elements which, for example, may be a pair of thermistors. The sensing elements are spaced from the jet nozzle and spaced apart relative to the jet axis to position them on opposite sides of the centerline of the jet in the area radially of the axis of the jet where there is a substantially linear variation in the jet velocity. Thus, when the jet is deflected relative to the sensing elements, the increase or decrease of the jet velocity over each of them is directly proportional to the magnitude of the jet deflection. In an instrument wherein the jet nozzle is about one-eighth of an inch in diameter, the jet velocity is about 100 inches per second, and the spacing of the origin of the jet at the exit of the nozzle to the sensing means is about one-half of an inch, the total deflection of the jet over the full scale of the instrument would be about one millimeter.

Gravity or, more broadly, acceleration sensitivity, is evidenced in such an instrument by an output signal when the unit is turned about its longitudinal axis. Such angular movement does not involve any movement in the plane of sensitivity of the instrument, that is, the plane defined by the axis of the jet and the two sensing elements, and there should accordingly be no displacement of the jet relative to the sensing elements and thus no output signal. The signal that is obtained is therefore an error.

It would appear that the erroneous signal that is obtained is produced by thermal deflection of the jet or the nonuniform cooling effect of the jet. While the present invention is not limited to the theory of operation, it would appear that, as the jet approaches the sensing elements, it begins to diverge into a flow or exhaust pattern that is determined by the arrangement of the exhaust ports. The flow tends to pass over the sensing elements at a slight angle diverging outwardly from the axis of the jet. However, the thermal effect on the jet by the local heating of the jet fluid as it passes over the sensing elements, tends to cause the heated fluid to rise because of its reduced density. This effect counteracts a downward deflection of the jet by the exhaust pattern and to reinforce an upward deflection of the jet by the exhaust pattern. Thus, the heat picked up from the sensing element is in one instance carried quickly away from the sensing element and its support but in the other instance may be carried back along the support, thereby raising the temperature of that support and reducing the heat normally dissipated from the respective sensing element by conduction along the support. This variation alters the temperature and thus the electrical resistance of the sensing elements or alternatively alters the power required to maintain the sensing elements at an equilibrium temperature, and thus produces a false output signal indistinguishable from a true output signal.

In accordance with this invention, it has been found that the erroneous signal thus produced can be minimized or substantially eliminated by the use of a ring flow constrictor positioned behind the thermistors in the downstream direction relative to the jet, the ring having a circular opening in the center thereof that is only slightly larger than required to surround and thus constrict the jet so that the flow path of the fluid over the sensing elements is maintained substantially parallel to the longitudinal axis of the unit.

The present invention is hereinafter disclosed with reference to the accompanying drawings, in which.

Figure 1:
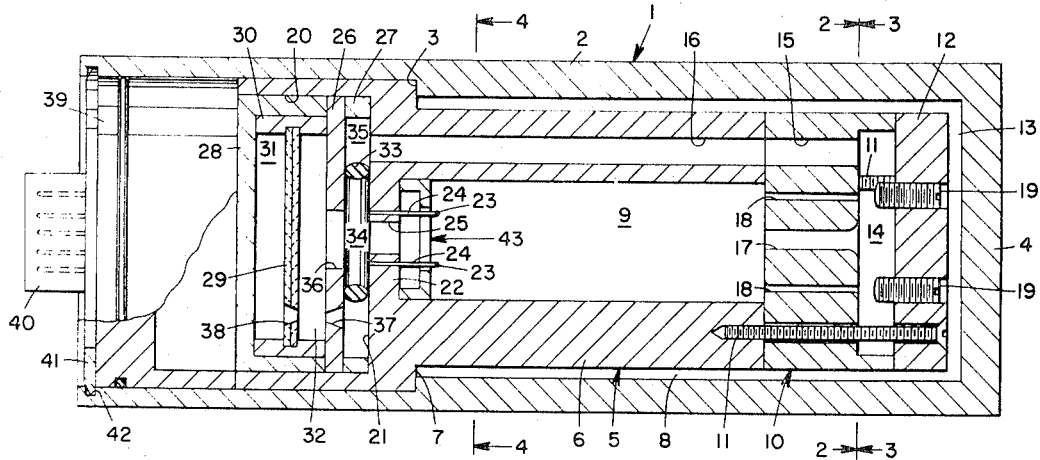
FIG. 1 is a schematic illustration in section of an instrument embodying the present invention.
Figure 2:
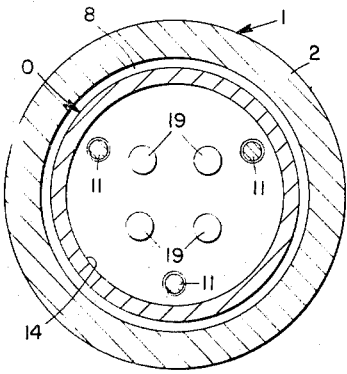
FIG. 2 is a sectional view taken substantially on the line 2—2 of FIG. 1.
Figure 3:
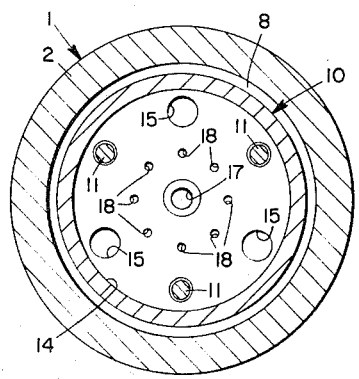
FIG. 3 is a sectional view taken substantially on the line 3—3 of FIG. 1.

With reference to the drawings, there is illustrated a fluid jet deflection type instrument comprising a housing 1 including a cylindrical sidewall 2 having internally thereof a shoulder 3 and closed therefore at one end by an end wall 4. A unit 5 is inserted into the housing 1 from the open end thereof, which unit comprises a body 6 having a shoulder 7 adapted to be seated against the shoulder 3 to position the unit 5 endwise in the housing 1. From the shoulder 7 outwardly to the open end of the housing 1, the body 6 has an external diameter that is adapted to be received within the sidewall 2 with a relatively close fit for supporting the body 6. The body 6 is preferably secured within the housing 1 by an adhesive applied at these opposed supporting surfaces. Inwardly of the housing 1 from the shoulder 7, the external diameter of the body 6 is smaller than the internal diameter of the sidewall 2 whereby that portion of the body 6 is supported in cantilever fashion relative to the sidewall 2 to provide an annular space 8 therebetween.

The body 6 has a cylindrical jet chamber 9 extending inwardly axially thereof from the end adjacent the end wall 4 of the housing 1. A nozzle member 10 is secured to the nozzle end of the body 6 by screws 11 that extend through an end plate 12 and the nozzle member 10, and are threaded into the body 6. The screws 11 are arranged radially outwardly of the body 6 from and about the periphery of the jet chamber 9, and there are preferably three of the screws 11 equally spaced angularly about the axis of the unit 5. The external diameter of the nozzle member 10 and end plate 12 is comparable to that of the adjacent portion of the body 5 whereby they are spaced inwardly from the housing 1 to continue the annular space 8. The body 6, nozzle member 10 and end plate 12 are dimensioned lengthwise relative to the housing 1 to space the end plate 12 from the end wall 4 to provide a clearance space 13 therebetween.

The nozzle member 10 is formed with a cavity extending axially inwardly from the end thereof adjacent to the end plate 12 to provide a plenum chamber 14 between the bottom of the cavity and the adjacent face of the end plate 12. Fluid is supplied to the plenum chamber 14 by a plurality of fluid inlets 15 in the form of bores in the nozzle member 10, each of which inlets 15 is open at one end into the plenum chamber 14 and is connected at the other end to a bore 16 extending endwise of the body 5. The bores 16 are aligned axially with the respective inlet 15 and are spaced radially form the axis of the unit 5 outwardly of the jet chamber 9. There are preferably three of the inlets 15 and bores 16 equally spaced angularly about the axis of the unit 5 intermediate the screws 11.

A nozzle 17 is formed in the nozzle member 10 with the inlet end thereof open into the plenum chamber 14 and the output end open into the jet chamber 9. The nozzle 17 is arranged to direct a fluid jet endwise of the jet chamber 9 substantially along the axis thereof, or, in other words, is aligned axially with the jet chamber 9. A plurality of vents 18 are formed through the nozzle member 10 between the plenum chamber 14 and the jet chamber 9, which vents are disclosed and claimed in U.S. Pat. application Ser. No. 632,238 filed Apr. 20, 1967, now U.S. Pat. No. 3,500,690 dated Mar. 17, 1970. The vents 18 surround the nozzle 17 and function to introduce fluid into the jet chamber 9 in the space surrounding the jet, thereby preventing a cyclical or counterflow of fluid in the jet chamber 9 in the space surrounding the jet, which counterflow is induced by aspiration by the jet. At the same time, by supplying the fluid from the same source to both the jet and the jet-surrounding space in the jet chamber 8, there is substantially eliminated any temperature or density differential between the fluids which would make the device gravity or acceleration sensitive.

The end plate 12 is provided with a plurality of set screws 19 threaded therethrough on axes substantially parallel to and arranged symmetrically about the axis of the nozzle 17. The leading ends of the screws 19 extend into the plenum chamber 14 and serve to alter the flow pattern of the fluid from the inlets 15 to the nozzle 17. The screws 19 thus provide for adjustment of the jet to compensate for variations arising, for example, from manufacturing tolerances and thus for centering the jet initially. After the jet is adjusted, the screws may be locked in the adjusted position, for example by an adhesive such as epoxy (not shown) deposited over the head thereof.

Figure 4:
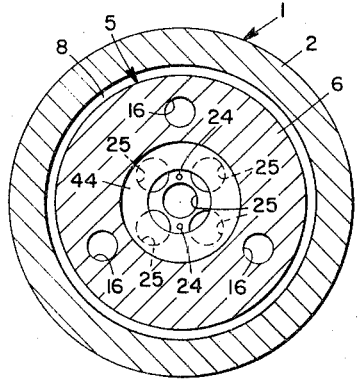
FIG. 4 is a sectional view taken substantially on the line 4—4 of FIG. 1.

The body 6 is provided with a cavity 20 extending axially inwardly thereof from the end opposite from the nozzle end of the jet chamber 9. The cavity 20 terminates at a bottom wall 21 that is spaced from the bottom wall of the jet chamber 9 by a partition 22. The sensing means of the instrument comprises a pair of spaced sensing elements whose electrical resistance varies with temperature, such as for example, the illustrated pair of thermistors 23, secured as by an adhesive to the free ends of a pair of glass rods or posts 24 mounted and adhesively fixed in bores in the partition 22. The thermistors 23 are substantially centered relative to the axis of the nozzle 17 and are spaced apart a distance relative to the cross section of the jet whereby they are disposed on opposite sides of the center of the jet. When the jet is deflected, the fluid passing over the thermistors will increase or decrease, depending upon whether the center of the jet is moved toward or from the respective thermistor. The partition 22 is also provided with a plurality of exhaust ports 25, FIG. 4, which ports 25 are disposed symmetrically relative to the thermistors 23 for exhausting the fluid from the jet chamber 9 with a minimum of turbulence. The posts 24 serve to space the thermistors 23 from the partition 22 so that the jet will flow smoothly relative thereto.

A pump means is disposed in the cavity 20 of the body 6, which pump means comprises an orifice plate 26 that is positioned in spaced relation relative to the bottom wall 21 of the cavity 20 by a ringlike spacer 27. The pump means also includes a cup-shaped end piece having an end wall 28 that closes the end of the cavity 20, and a pump 29 that is mounted between and in spaced relation to the end wall 28 and the orifice plate 26 by a spacer 30, which, for assembly purposes, may be resilient so that it can be deformed over the edge of the pump plate 29. The spacer 30 also serves to hold the pump plate 29 without confining it too severely and thus inhibiting or damping the vibration thereof. By way of example, the spacer 30 may be made of a relatively hard rubber. The various elements are preferably secured adhesively in the assembled relation.

The space between the end wall 28 and the pump plate 29 constitutes a pump chamber 31 while the space between the pump plate 29 and the orifice plate 26 constitutes an intake chamber 32. The space between the orifice plate 26 and the bottom wall 21 of the cavity 20 is separated by a divider in the form of an O-ring 33 into a centrally located exhaust chamber 34 and an annular pressure chamber 35 surrounding the same. The orifice plate 26 is provided at the center thereof with an exhaust opening 36 interconnecting the exhaust chamber 34 and the intake chamber 32. The orifice plate 26 is also provided with an outlet orifice 37 adjacent the periphery thereof that interconnects the intake chamber 32 and the pressure chamber 35. The pump plate 29 is provided with a pump orifice 38 axially aligned across the inlet chamber 32 from the outlet orifice 37 of the orifice plate 26.

The illustrated pump means, which is like that forming the subject matter of U.S. Pat. application Ser. No. 830,830, filed June 5, 1969, comprises a pair of laminated disclike piezoelectric crystals which are adapted to be electrically energized alternately whereby the crystals are alternately expanded and/or contracted. The pump plate 29 is thus caused to buckle with a contracting crystal at the concave side and an expanding crystal at the convex side. When the polarity of the voltage on the crystals is reversed, the pump plate 29 buckles in the opposite direction. The crystals are adapted to be energized by an oscillator (not shown) which alternates, for example, at a frequency of 2,800 cycles per second.

As the pump plate 29 buckles to enlarge the volume of the pump chamber 31, fluid is drawn into the pump chamber from the intake chamber 34 through the orifice 37. As the pump plate 29 buckles to decrease the volume of the pump chamber 31, a charge of air is expelled through the pump orifice 38. This charge of air has sufficient energy to carry across the intake chamber 34 and through the outlet orifice 37 into the pressure chamber 35. The charge of air is dispersed throughout the pressure chamber 35 and moves uniformly through the bores 16 and inlets 15 into the plenum chamber 14. From the plenum chamber 14, the fluid passes through the nozzle 17 and vents 18 into the jet chamber 9. After passing endwise of the jet chamber 9 over the thermistors 23, the fluid is exhausted through the ports 25 into the exhaust chamber 34 and from the chamber 34 through the exhaust opening 36 into the inlet chamber 32 from which it is drawn by the pump and recirculated.

The open end of the housing 1 is closed by an end cap 39 including an electrical connector 40, which cap is secured in the housing 1 by an expansion ring 41 that cooperates with a groove 42 internally of the housing 1. The electrical components of the instrument, that is, the thermistors 23 and pump plate 29, are wired to the connector 40 which provides for connecting the same externally to an appropriate electrical circuit (not shown) which may be for example of the type disclosed and claimed in application Ser. No. 830,826, filed June 5, 1969. Briefly, this circuit may comprise a bridge circuit for heating each of the thermistors to a temperature at which the resistance of the thermistors will produce equilibrium in the respective bridge circuit and the power supplied to each of the thermistors will be sufficient only to replace the heat that is lost by dissipation. When the jet is deflected, the rate at which the heat is dissipated from each of the thermistors increases or decreases, depending upon whether the axis of the jet is moved toward or away from the respective thermistor. When the thermistor cools, the resistance thereof increases, and in response thereto the bridge becomes unbalanced and more power is delivered to the thermistor to reheat it to the equilibrium temperature of the bridge. Conversely, when the cooling rate of the thermistor is decreased, the temperature of the thermistor increases and its resistance increases, so that its bridge circuit is unbalanced and the power to the thermistor is reduced until its temperature falls to its equilibrium temperature at the new cooling rate. By comparing the bridge voltages of the two bridges, the cooling rate of the jet on the two thermistors, and thus the lateral position of the jet relative to the two thermistors can be determined. The reaction time of the circuit is almost instantaneous to provide a continuous and immediate indication of the jet position.

In accordance with the invention forming the subject matter of the above mentioned application Ser. No. 632,239, the diameter of the nozzle 17 and the fluid viscosity and pressure are selected to provide laminar flow of the jet issuing from the nozzle. At the same time, the diameter of the jet chamber 9 is selected to dampen the jet and thereby avoid hunting when the jet is deflected without imposing a frictional drag upon the same. By way of example, the unit may include a nozzle 17 that is one-eighth of an inch in diameter. The thermistors may be spaced from the nozzle a distance that may be, for example, as little as one-half an inch, the selected spacing being a function primarily of the selected jet velocity and the desired range of sensitivity of the instrument. With the thermistors spaced, for example, a distance of about 2 inches from a ⅛-inch nozzle, the thermistors are spaced apart a distance of a little over one-eighth of an inch to place them on opposite sides of the centerline of the jet in the area radially of the jet where there is substantially linear variation in the jet velocity. The posts 23 in such an arrangement are preferably about one-tenth of an inch high. The fluid pressure at the plenum chamber 14 is about 0.0005 p.s.i., which will maintain a jet velocity with air of about 100 inches per second and a flow rate of less than 2 cubic feet per hour. The Reynolds number of the fluid at the nozzle is between 400 and 1,000 to provide laminar flow in the jet. The diameter of the jet chamber 9 in such a device may be about one-half of an inch to provide effective damping without imposing excessive drag upon the jet or overdamping the jet and thus reducing its responsiveness.

In an angular movement sensing instrument, deflection of the jet occurs when the sensing elements are displaced laterally during the time that a particular increment of jet fluid is in transit from the nozzle to the sensing elements from their positions at the time the increment of jet fluid was discharged by the nozzle. Thus, this increment of jet fluid will engage the sensing elements in a noncentered condition, with the amount and direction of the displacement from the centered condition indicating the direction and the angular rate of the turn.

Figure 6:
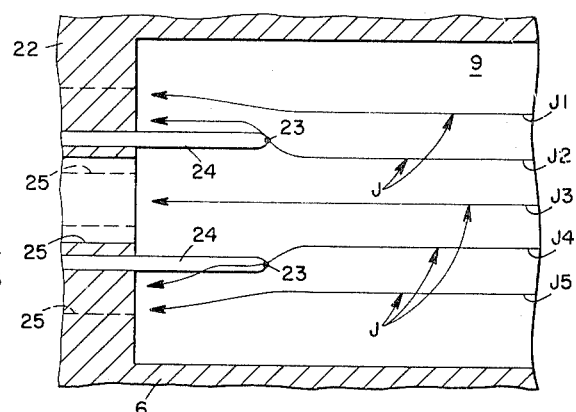
FIG. 6 is a view similar to FIG. 5 but illustrating the flow pattern of the fluid over the sensing elements in a unit without the flow constrictor in accordance with this invention.

In FIG. 6 there is illustrated flow lines J which indicate the theoretical flow pattern of the jet in a unit that does not incorporate the present invention. The deflection of the jet as illustrated by the flow lines J is the combined function of the pattern of the exhaust ports 25 and the deflection that is caused by the heating of the fluid as it passes over the thermistors 23. As illustrated, the flow line J3 at the center of the jet traverses a substantially straight path along the axis of the unit, while the flow lines J1 and J5, which represent fluid increments at the periphery of the jet, traverse substantially straight paths that diverge into an exhaust pattern as they approach the end of the jet chamber. The flow lines J2 and J4, which represent the fluid increments which are passing substantially over the thermistors 23 at the moment, initially tend to diverge into the exhaust pattern but are also heated by the thermistors so that they tend to rise. The flow line J4 is thus modified from the normal exhaust pattern so that it passes over the lower thermistor 23 and along the post 24 thereof as it is lifted by the thermal effect, and then again diverges under the influence of the exhaust pattern. On the other hand, the exhaust pattern and the thermal effect both tend to lift the flow line J2 so that it passes more directly over and then away from the upper thermistor 23. The heating effect of the upper thermistor is thus carried away from the post 24 more quickly while that of the lower thermistor is carried along the respective post 24. Primarily because the lower post is thus hotter than the upper post and by conduction cools the lower bead less, the net effect is that the upper thermistor tends to be cooled more than the lower thermistor. This cooling differential is indistinguishable from the colling differential produced by a jet deflection to which the instrument is designed to respond.

Figure 5:
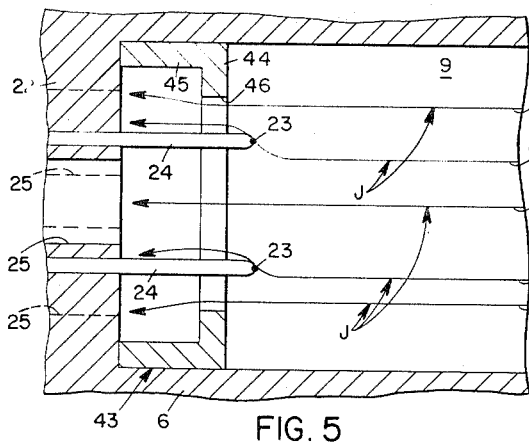
FIG. 5 is a fragmentary view in section of a portion of FIG. 1 illustrating the flow pattern of the fluid jet over the sensing elements.

In FIG. 5 there is illustrated the flow pattern of the jet in a unit embodying the present invention. As illustrated, there is provided constriction means 43 which consists of an annular element or ring 44 in and substantially normal to the axis of the jet chamber 9 and a hub portion 45 for spacing the ring 44 from the partition 22. The ring 44 is located immediately behind or downstream relative to the jet from the thermistors 23 and has a central opening 46 aligned axially with the jet chamber 9 and nozzle 17 and having a diameter that is for example slightly less than twice the spacing of the thermistors 23. Thus, the tendency of the jet to diverge into the exhaust pattern in advance of the thermistors 23 is counteracted by the constriction afforded by the ring 44 so that the flow over the sensing elements is substantially linear, that is, the flow lines J are forced into paths that are substantially parallel to the axis of the unit as it passes over thermistors. In effect, the exhaust pattern of the jet is postponed until the jet passes the ring 44. As a result, the flow line J4, which is the flow line that is passing over the lower thermistor at the moment and is not normally the same flow line as the flow line J4 of FIG. 6, is lifted by the thermal effect from the post 24. In the same manner, the flow line J2 passing over the upper thermistor 23 is also lifted from the respective post 24 so that each of the thermistors 23 is subjected to substantially the same cooling effect. Beyond the ring 44, the flow lines J diverge into the exhaust pattern established by the exhaust ports 25.

The vertical orientation of the plane of sensitivity as illustrated in FIGS. 5 and 6 and the opposite position at one-half a turn about the longitudinal axis of the unit from the illustrated position, represent the positions of maximum error. When the unit is rotated about its longitudinal axis to positions at one-fourth of a turn in either direction from the illustrated position, that is, with the plane of sensitivity oriented horizontally, there is minimum error in the unit caused by thermal deflection of the jet. At intermediate positions, the error varies between the minimum and maximum but in all cases is reduced or virtually eliminated by the ring 44.

As noted above, the diameter of the opening 46 is a little less than twice the spacing of the thermistors 23. This dimension is designed to accommodate the normal range of jet deflection without distortion while still effectively counteracting the divergence of the jet imposed by the exhaust pattern until after the jet has passed the sensing elements. Thus, the flow of the fluid is substantially the same over both of the sensing elements and the thermal deflection of the jet at both of the sensing elements is also substantially the same. With a uniform flow pattern relative to both of the sensing elements, the cooling effect, in the absence of a true jet deflection, is the same.

What I claim and desire to protect by letters Patent is:

1. A fluid jet deflection type instrument comprising:
    a body having a jet chamber,
    nozzle means having a nozzle for directing a fluid jet endwise of said jet chamber,
    a pair of spaced thermistors disposed in said jet chamber remote from said nozzle and symmetrically positioned relative to the axis thereof for producing an output signal in response to deflection of the fluid jet from symmetry relative thereto and for indicating the magnitude and direction of such deflection,
    said thermistors being electrically heated and having electrical resistances which vary with the temperature thereof thereby tending to impart thermal deflection of the fluid jet relative to the thermistors,
    a plurality of exhaust ports symmetrically positioned behind said thermistors for exhausting fluid directed from said nozzle from the jet chamber with a minimum of turbulence,
    constriction means disposed in said jet chamber in front of said exhaust ports for confining a fluid jet from said nozzle to substantially linear flow over said thermistors whereby there is substantially eliminated an output signal produced by a nonuniform cooling of the thermistors because of the aforesaid thermal deflection,
    and means for supplying fluid under pressure to said nozzle.

2. A fluid jet deflection-type instrument in accordance with claim 1 in which said constriction means comprises a ring disposed substantially normal to the axis of said chamber and having an opening for surrounding a fluid jet and for counteracting the fluid flow effect imposed on the jet fluid by the exhaust means.

3. A fluid jet deflection-type instrument in accordance with claim 2 in which said exhaust means establishes a diverging exhaust pattern in a fluid jet approaching said exhaust means, and said constriction means counteracts the divergence of said jet whereby the divergence thereof is constrained until the fluid jet passes said opening in said constriction means.

4. A fluid jet deflection-type instrument in accordance with claim 3 in which said exhaust means comprises exhaust ports in an end wall of said jet chamber.

5. A fluid jet deflection-type instrument in accordance with claim 2 in which said opening is about twice the spacing of said thermistors.

* * * * *